United States Patent [19]

Caldwell

[11] 4,155,504
[45] May 22, 1979

[54] THERMOSTATIC VENTILATOR ACTUATOR

[76] Inventor: Edward N. Caldwell, Rte. 17 Coward Mill Rd., Knoxville, Tenn. 37921

[21] Appl. No.: 780,759

[22] Filed: Mar. 24, 1977

[51] Int. Cl.$^2$ .............................................. F24F 7/00
[52] U.S. Cl. .................................... 236/49; 236/99 E; 236/100
[58] Field of Search ............ 236/100, 49, 99 E, 99 K; 60/527, 530; 98/40 UT; 73/368.1; 49/345, 25

[56] References Cited

U.S. PATENT DOCUMENTS

| | | | |
|---|---|---|---|
| 729,927 | 6/1903 | Fulton | 73/368.1 X |
| 816,916 | 4/1903 | Keeler | 49/435 |
| 2,408,269 | 9/1946 | Peterson | 73/368.1 X |
| 2,511,042 | 6/1950 | Branson | 236/99 E |
| 2,754,062 | 7/1956 | Von Wangenheim | 236/100 X |
| 3,036,777 | 5/1962 | Budde | 73/368.1 X |
| 3,386,065 | 5/1968 | Algino | 236/100 X |
| 4,055,954 | 11/1977 | Marks et al. | 60/527 |

Primary Examiner—William E. Wayner
Assistant Examiner—William E. Tapolcai, Jr.
Attorney, Agent, or Firm—Douglas R. Scott

[57] ABSTRACT

A thermostatic ventilator operator has a thermostatic actuator consisting of a pair of tubes telescoped together with a plurality of thermally responsive power elements arranged coaxially therein. An operating lever is pivoted on a mounting bracket. The thermostatic actuator is pivotally connected to the mounting bracket and to the operating lever with one of the pivots being slidable in a direction normal to its axis. A pair of extension springs bias the slidable pivot in one direction.

4 Claims, 6 Drawing Figures

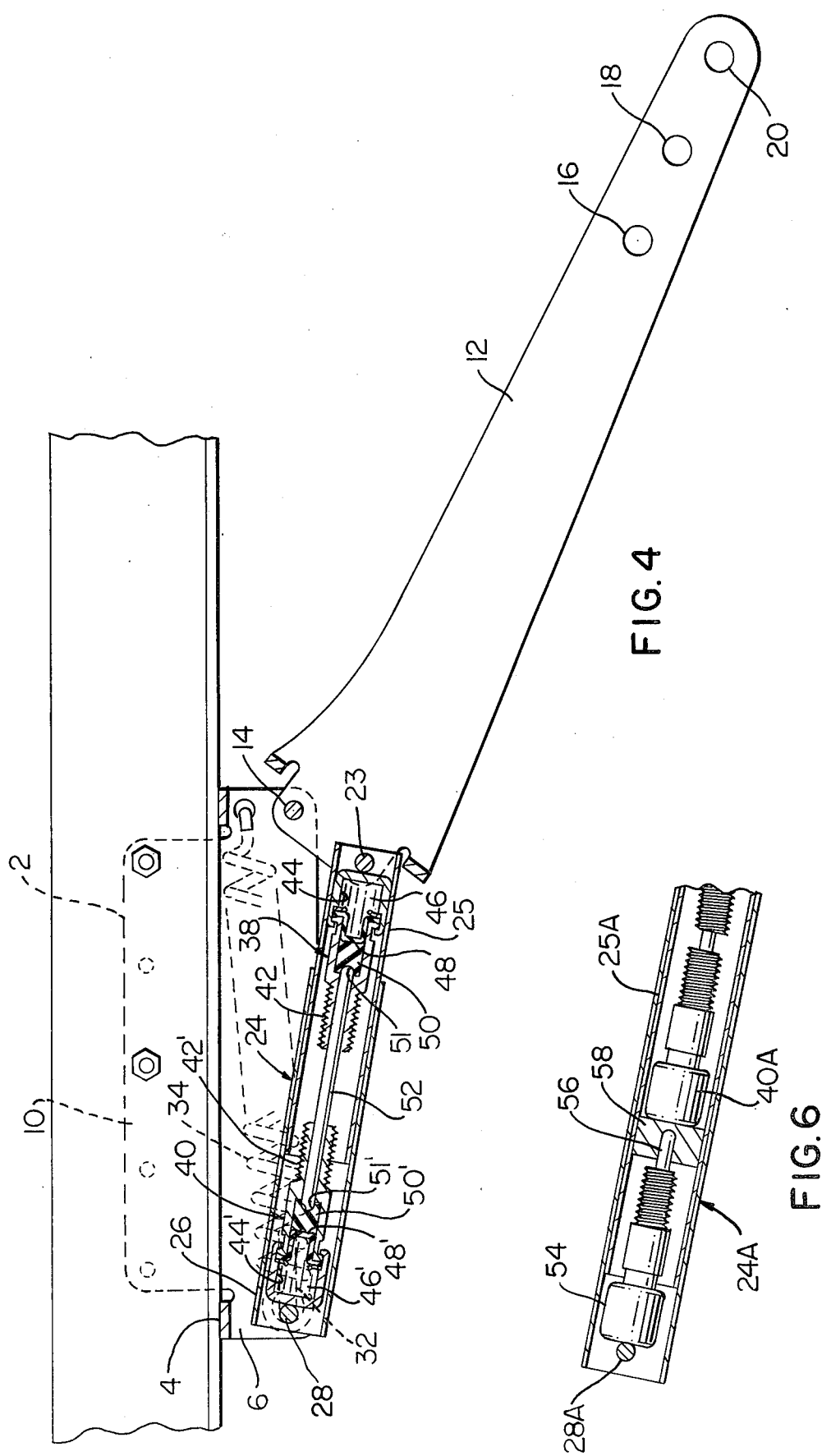

THERMOSTATIC VENTILATOR ACTUATOR

Self powered thermostatic operators have been used to operate ventilation dampers but they have been limited in the amount of work they can do. In greenhouse applications, a relatively heavy glass window must be raised to release warm air when the interior of the greenhouse gets too hot. To raise such a window, an actuator must be responsive to the temperature of the interior of the greenhouse and be capable of performing a substantial amount of work in moving a large force through a considerable distance.

Metal bellow assemblies with vapor-pressure charges are sensitive to temperature changes but are expensive and produce small forces. Liquid charged bellows assemblies can develop large forces with temperature change but produce very little movement. They, too, are expensive and respond slowly to temperature changes.

Thermostatic power elements that utilize a wax charge which expands and contracts as it undergoes changes of state are well known in the art. However, in order to effect the change of state of the wax, the heat of fusion must be transferred into and out of the charge. Waxes used are relatively poor heat conductors and, although copper powders are mixed with the wax to facilitate heat transfer, the rate of heat transfer is relatively slow. This makes large power elements, which are capable of doing considerable work, impractical where they must respond to ambient air conditions. Heat cannot get into nor out of the entire large charge fast enough to make their response time practical. In addition, the heat gradient required to get the heat of fusion to the center of a large wax charge requires larger ambient temperature changes than with smaller charges.

In the present invention, to provide a sensitive, inexpensive, thermostatic operator capable of doing substantial amounts of work, a plurality of relatively small power elements with relatively small charges are arranged in axial array so that their work outputs are additive. An inexpensive alignment mechanism for the thermally responsive power elements takes the form of a pair of telescoped tubes with the elements located therein.

Axial alignment of a pair of wax charged power elements is effected by using a common piston for the pair.

Accordingly, it is an object of this invention to provide an inexpensive, sensitive, thermostatic operator capable of doing substantial amounts of work.

Another object of this invention is to assure axial alignment of a plurality of thermostatic power elements in a ventilator operator.

Other objects and advantages of this invention will be apparent from the description which proceeds with reference to the accompanying drawings forming a part thereof and wherein:

FIG. 4 is a sectional view similar to FIG. 2 with the parts thereof in third operating positions.

FIG. 6 is a partial sectional view similar to FIG. 2 showing a second embodiment of this invention.

Figure 2:
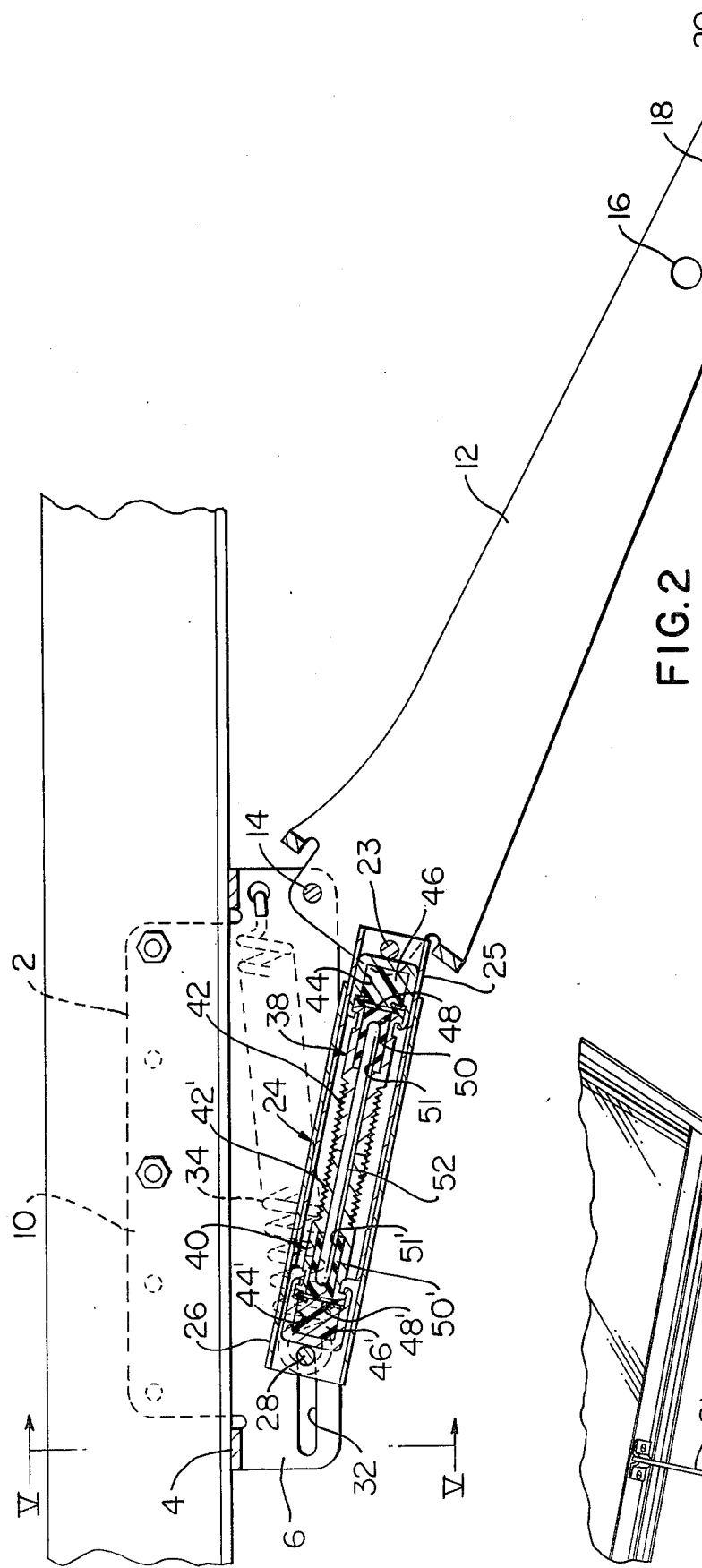
FIG. 2 is a sectional view taken along the line II—II of FIG. 1.

Referring now to the FIGS. 1-5, the improved operator of this invention includes a mounting bracket indicated generally by the reference numeral 2. The mounting bracket 2 is formed from a channel having a bite portion 4, depending leg portions 6, 8, and an upstanding tab 10, which is lanced from the bite portion 4 and positioned coplanar with the leg portion 6.

Figure 1:
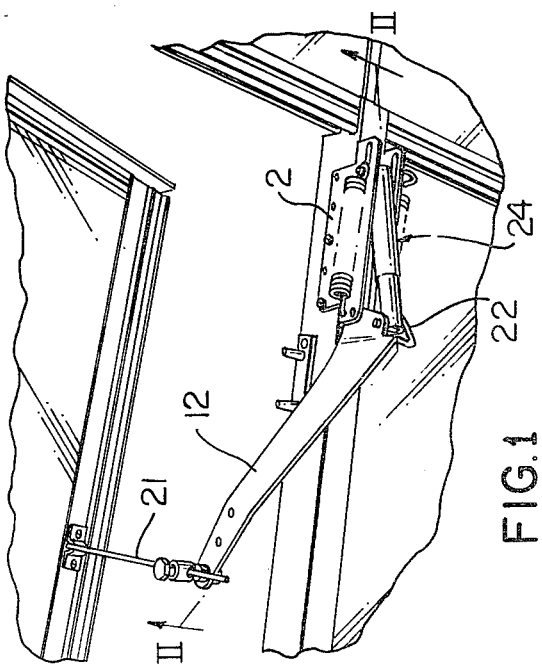
FIG. 1 is a perspective view of the operator of this invention as applied to a greenhouse window.
Figure 5:
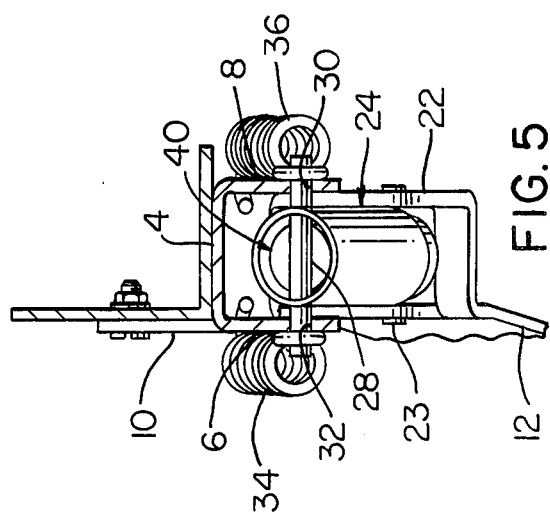
FIG. 5 is a sectional view taken on the line V—V of FIG. 2.
Figure 3:
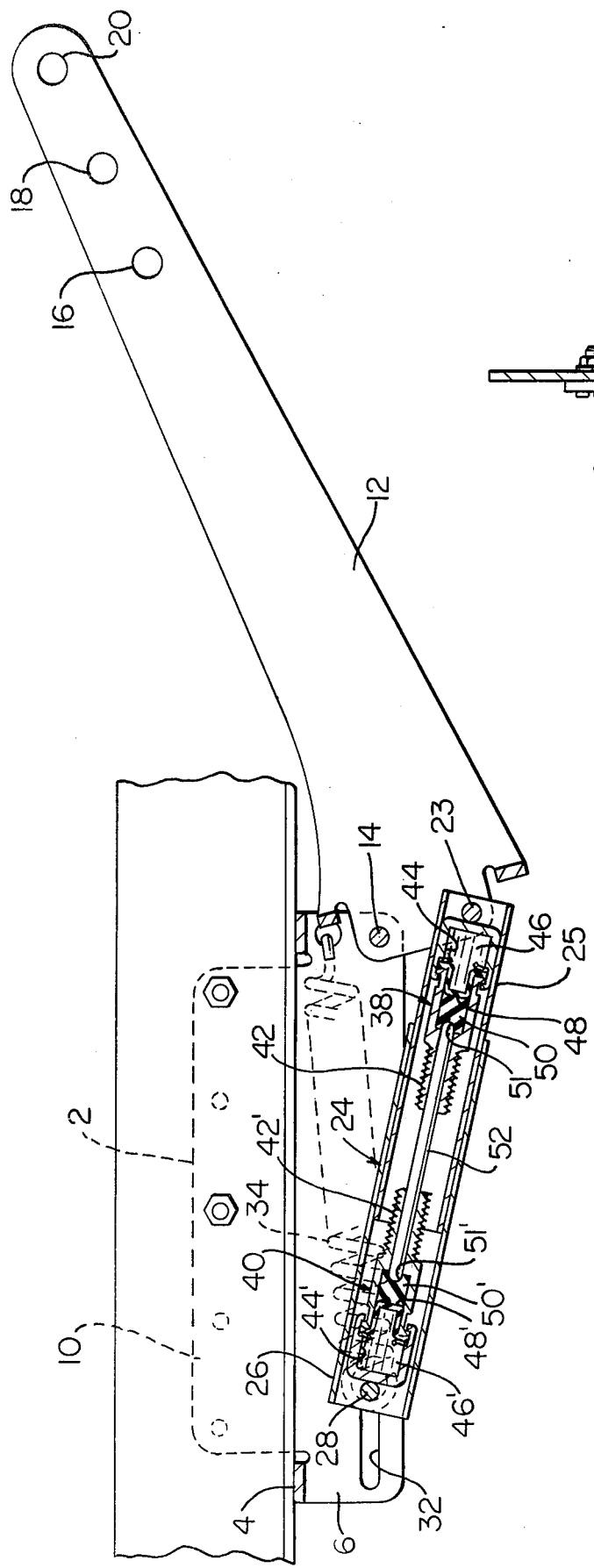
FIG. 3 is a sectional view similar to FIG. 2 with the parts thereof in second operating positions.

An operating level 12 is pivoted on a pin 14 secured in the leg portions 6, 8 adjacent one end of the bracket 2. The free end of the lever 12 is provided with holes 16, 18, 20 to receive suitable linkage 21 for connection to a load as shown in FIG. 1. An offset tab 22 is formed on the lever 12 adjacent the pivot pin 14 and a pin 23 is secured in the tab 22 and the main body of the lever 12 with the axis thereof disposed normal to the plane of the lever 12.

A thermally responsive actuator is provided and includes an axially extensible guide assembly indicated generally by the reference numeral 24. The guide assembly 24 includes a first tube 25 pivoted on the pin 23 and slidably telescoped within a second tube 26. The second tube 26 has one end pivotally mounted on a pin 28 which is slidably mounted in a pair of parallel slots 30, 32 formed in the legs 6, 8 of the bracket 2 at the end of the bracket that is opposite the pivot pin 14. A pair of extension springs 34, 36 are connected to the pin 28 and to the mounting bracket 2 to bias the pin 28 to the right as viewed in FIG. 2 and normally hold the pin 28 at the ends of the slots 30, 32 which are closest to the pivot pin 14.

A pair of thermally responsive power elements 38, 40 are positioned in axial alignment within the guide assembly 24. The power elements 38, 40 are of the type well known in the art and are low in cost since they are mass produced for use in automobile radiator thermostats and pollution control valves. The power elements 38, 40 are identical and are provided with bodies 42, 42' having chambers 44, 44' formed therein. The chambers 44, 44' are filled with wax charges 46, 46' which are compounded to melt within the desired control range, for example 75°—80° F. Flexible diaphragms 48, 48' close the chambers 44, 44' and engage elastomeric plugs 50, 50' which are disposed within the bodies 42, 42' and provided with axially extending recesses 51, 51'. A common piston 52 is positioned with one end in the recess 51 and the other end in the recess 51'. The body 42 of the element 38 is seated on the pin 23 and is held in position by the tube 25. The body 42' of the power element 40 is seated on the pin 28 and is held in position by the tube 26. It is to be noted that, since the tubes 25, 26 serve only to position the power elements 38, 40 and carry no thrust, they may be fabricated of very thin walled tubing (on the order of 0.007"). As a result, they have small thermal mass and detract little from the ability of the power elements 38, 40 to respond to ambient temperature changes.

In operation, the parts of the operator will be positioned as shown in FIG. 2 when cold. As the ambient temperature increases, the wax charges 46, 46' melt and increase in volume. This causes the plugs 50, 50' to be compressed and forces the piston 52 out of the recesses 51, 51'. As the piston 52 is forced from the recesses 51, 51', it moves to the right, as viewed in FIGS. 2 and 3, moving out of the body 42' of the power element 40. At the same time, the body 42 of the power element 38 is forced to the right, yielding a total movement that is transmitted to the operating lever 12 through the pin 23, rotating the lever 12 to the position shown in FIG. 3. A reduction in ambient temperature will cause the charges 46, 46' to solidify and contract, permitting the weight of the load to return the operator to the position shown in FIG. 2.

In the event the operating lever 12 is restrained from movement, as it would be if the ventilating window of FIG. 1 were locked closed, extension of the thermal assembly will move the pin 28 along the slots 30, 32 against the bias of the springs 34, 36 to the position shown in FIG. 4 and prevent overloading of the power elements 38, 40.

In the embodiment shown in FIG. 6, an odd number of power elements are utilized. Parts corresponding to parts previously described are designated by like reference numerals with the suffix "A".

A third thermally responsive power element 54 is positioned within the guide assembly 24A and seated on pin 28A and includes a piston 56 to which is secured a cylindrical guide element 58. The guide element 58 slidably engages the inner wall of the tube 25A and abuts the base of the power element 40A. It will be apparent that, with this arrangement, any number of power elements can be stacked to provide the stroke desired.

While the form of the invention now preferred has been illustrated and described as required by the Patent Statute, it is understood that other forms can be utilized and still come within the scope of the appended claims.

What is claimed is:

1. A thermostatic ventilator operator comprising an axially extensible guide assembly having a first cylindrical tube and a second cylindrical tube telescoped within said first tube and being axially slidable relative thereto, a plurality of thermally responsive power elements positioned within said guide assembly along the axis thereof, said power elements containing a solid thermostatic material which is expansible upon change of state and having respective body portions, at least one of said body portions engaging the inner cylindrical surface of at least one of said tubes to be maintained in axial alignment thereby and being operatively connected to each other to produce a cumulative axial movement, means for operatively connecting one of said power elements to said first tube, means for operatively connecting another of said power elements to said second tube, a mounting member, an operating member pivoted on said mounting member, and connection means for pivotally connecting one end of said guide assembly to said mounting member and pivotally connecting the other end of said guide assembly to said operating member, said connection means including a pivot movable through a plurality of positions in directions normal to the axis thereof, and means for biasing said pivot toward one of said positions.

2. A thermostatic ventilator operator as claimed in claim 1 wherein said pivot comprises a pin extending through one end of said guide assembly, said pin being slidably mounted in at least one slot formed in one of said members.

3. A thermostatic ventilator operator as claimed in claim 2 wherein said mounting member comprises a channel shaped element having a pair of parallel slots formed in the leg portions adjacent one end thereof, said pin having opposite ends slidably mounted in each of said slots to position said one end of said guide assembly between said leg portions.

4. A thermostatic ventilator operator as claimed in claim 3 wherein said biasing means comprises a pair of extension springs respectively connected at one end to said mounting member and at the other end to said opposite ends of said pin.

* * * * *